US009670787B2

(12) United States Patent
Koyanagi et al.

(10) Patent No.: US 9,670,787 B2
(45) Date of Patent: Jun. 6, 2017

(54) TI—AL-BASED HEAT-RESISTANT MEMBER

(71) Applicants: Yoshihiko Koyanagi, Aichi (JP); Hiroyuki Takabayashi, Aichi (JP); Yoshinori Sumi, Aichi (JP)

(72) Inventors: Yoshihiko Koyanagi, Aichi (JP); Hiroyuki Takabayashi, Aichi (JP); Yoshinori Sumi, Aichi (JP)

(73) Assignee: DAIDO STEEL CO., LTD., Aichi (JP)

( * ) Notice: Subject to any disclaimer, the term of this patent is extended or adjusted under 35 U.S.C. 154(b) by 275 days.

(21) Appl. No.: 14/665,470

(22) Filed: Mar. 23, 2015

(65) Prior Publication Data

US 2015/0275673 A1 Oct. 1, 2015

(30) Foreign Application Priority Data

Mar. 27, 2014 (JP) ................................ 2014-065673
Feb. 17, 2015 (JP) ................................ 2015-028942

(51) Int. Cl.
*C22C 14/00* (2006.01)
*C22F 1/18* (2006.01)
(Continued)

(52) U.S. Cl.
CPC ................ *F01D 5/28* (2013.01); *C22C 14/00* (2013.01); *C22F 1/183* (2013.01); *F01D 5/286* (2013.01);
(Continued)

(58) Field of Classification Search
CPC ......... F01D 5/282; F01D 5/286; C22C 14/00; C22F 1/183; F05D 2220/40; F05D 2230/41; F05D 2300/173; F05D 2300/174
See application file for complete search history.

(56) References Cited

U.S. PATENT DOCUMENTS 4,788,035 A * 11/1988 Gigliotti, Jr. ........... C22C 14/00 148/421
4,842,817 A * 6/1989 Shyh-Chin .............. C22C 14/00 420/407
(Continued)

FOREIGN PATENT DOCUMENTS

EP 0575106 A1 12/1993
JP 06-264203 A 9/1994
(Continued)

OTHER PUBLICATIONS

European Search report issued with respect to application No. 15160162.2, mail date is Aug. 10, 2015.
(Continued)

*Primary Examiner* — Igor Kershteyn
(74) *Attorney, Agent, or Firm* — Greenblum & Bernstein, P.L.C.

(57) ABSTRACT

The present invention relates to a Ti—Al-based heat-resistant member including a Ti—Al-based alloy which includes: 28.0 mass % to 35.0 mass % of Al; 1.0 mass % to 15.0 mass % of at least one selected from the group consisting of Nb, Mo, W and Ta; 0.1 mass % to 5.0 mass % of at least one selected from the group consisting of Cr, Mn and V; and 0.1 mass % to 1.0 mass % of Si, with the balance being Ti and unavoidable impurities, in which a whole or a part of a surface of the Ti—Al-based heat-resistant member includes a hardened layer as a surface layer, the hardened layer having a higher hardness than an inside of the Ti—Al-based heat-resistant member, and the Ti—Al-based heat-resistant member has a hardness ratio (a hardness of the surface layer/a hardness of the inside) of 1.4 to 2.5.

22 Claims, 11 Drawing Sheets

(51) Int. Cl.

| | |
|---|---|
| ***C21D 1/19*** | (2006.01) |
| ***C21D 1/18*** | (2006.01) |
| ***F01D 5/28*** | (2006.01) |

(52) U.S. Cl.

CPC ...... *F05D 2220/40* (2013.01); *F05D 2230/41* (2013.01); *F05D 2300/173* (2013.01); *F05D 2300/174* (2013.01)

(56) References Cited

U.S. PATENT DOCUMENTS

| | | | | |
|---|---|---|---|---|
| 4,842,819 A * | 6/1989 | Huang | C22C 14/00 | 148/421 |
| 4,879,092 A * | 11/1989 | Huang | C22C 14/00 | 148/421 |
| 5,028,491 A * | 7/1991 | Huang | C22C 14/00 | 148/421 |
| 5,149,497 A * | 9/1992 | McKee | C22C 14/00 | 148/421 |
| 5,518,820 A * | 5/1996 | Averbach | F16C 33/30 | 384/125 |
| 5,908,516 A * | 6/1999 | Nguyen-Dinh | C22C 14/00 | 148/421 |
| 8,771,439 B2 * | 7/2014 | Qu | C22C 14/00 | 148/276 |
| 2001/0022946 A1 | 9/2001 | Tetsui et al. | | |
| 2004/0055676 A1 | 3/2004 | Tetsui et al. | | |

FOREIGN PATENT DOCUMENTS

| | | |
|---|---|---|
| JP | 08-144034 A | 6/1996 |
| JP | 2001-316743 A | 11/2001 |
| JP | 2002-356729 A | 12/2002 |

OTHER PUBLICATIONS

Office Action issued in European Patent Application No. 15 160 162.2, mailed Aug. 1, 2016.

* cited by examiner (a) SURFACE LAYER PART
($\alpha_2$ VOLUME RATIO: ≥30%)

(b) INSIDE
($\alpha_2$ VOLUME RATIO:
5% OR MORE AND LESS THAN 30%)

TI—AL-BASED HEAT-RESISTANT MEMBER

FIELD OF THE INVENTION

The present invention relates to a Ti—Al-based heat-resistant member. More particularly, the invention relates to a Ti—Al-based heat-resistant member which is suitable for use as a turbine wheel of an automotive turbocharger, etc.

BACKGROUND OF THE INVENTION

The turbine wheels of automotive turbochargers are required to have high-temperature heat resistance since the turbine wheels are exposed to the high-temperature gas discharged from the engines. Alloys having excellent heat resistance, such as Ni-based alloys and Ti—Al alloys, have hence been used as the turbine wheels.

Ti—Al alloys are slightly inferior in oxidation resistance to Ni-based alloys such as Inconel (registered trademark) 713C. It is, however, known that the oxidation resistance is improved by adding Nb, Si, etc. to the Ti—Al alloys. In addition, since the amount of oxygenic components contained in actual automotive exhaust gases is small, the problem due to oxidation is being overcome.

Meanwhile, the temperature of the exhaust gases tends to rise as a result of the trend toward improvements in fuel efficiency and combustion efficiency, and improvements in strength property at high temperatures exceeding 900° C. are becoming an important subject.

In order to solve this problem, various proposals have hitherto been made.

For example, Patent Document 1 discloses a Ti—Al-based alloy which includes 38 to 45 at.% of Al and 3 to 10 at.% of Mn, with the balance being Ti and unavoidable impurities.

The document describes that the Ti—Al-based alloy can be made to combine machinability and high-temperature strength by suitably controlling the lamellar structure and the β phase within the Ti—Al-based alloy.

Patent Document 2 discloses a Ti—Al-based alloy which includes 38 to 48 at.% of Al and 4 to 10 at.% of Mn, with the balance being Ti and unavoidable impurities.

This document describes that the room-temperature ductility and, in particular, impact properties of the Ti—Al-based alloy are greatly improved when the alloy has a specific average grain diameter.

Patent Document 3 discloses a process for producing an alloy based on a Ti—Al-based intermetallic compound, the process including:

(1) subjecting a Ti—Al-based alloy containing 42 to 52 at.% of Al to grain fining by working the alloy at a strain rate of 1/sec or higher in an α-Ti single phase region with a temperature higher than 1,300° C.; and (2) conducting a lamella formation treatment in which lamellae of TiAl and $Ti_3Al$ are yielded within the fine crystal grains obtained, thereby producing a fine lamellar grain structure.

This document indicates that a structure which is entirely configured of fine lamellar grains has an excellent property balance among ordinary-temperature ductility, high-temperature strength, and fracture toughness.

Furthermore, Patent Document 4 discloses a process for producing a Ti—Al intermetallic compound containing a lamellar structure, in which a heat treatment for increasing the lamellar layer spacing is performed at a temperature not higher than the solidus temperature.

This document describes that, by controlling the lamellar layer spacing, properties according to purposes (strength, hardness, heat resistance, impact resistance, etc.) can be controlled.

As described in Patent Documents 1 to 4, to control the structure of a Ti—Al-based alloy is effective in improving the mechanical properties of the Ti—Al-based alloy. However, there are limitations on the improvements in mechanical property attained by controlling the grain diameter or by controlling the lamellar spacing.

With respect to Ti—Al-based alloys, carbonizing and nitriding are also conducted in order to heighten the surface hardness. However, since these treatments yield carbides and nitrides, such as TiC and TiN, in the surface, there is a concern that such carbides and nitrides may cause a decrease in toughness or serve as starting points for surface fracture. In addition, the necessity of such surface treatments considerably affects the cost.

Meanwhile, it is possible in Ti—Al-based alloys to increase the hardness of the base material itself. However, the higher the hardness of the base material, the poorer the toughness thereof. Consequently, a material in which the hardness of the whole base material has been heightened cannot be used as an actual member on which high load is imposed.

Patent Document 1: JP-A-2002-356729

Patent Document 2: JP-A-2001-316743

Patent Document 3: JP-A-08-144034

Patent Document 4: JP-A-06-264203

SUMMARY OF THE INVENTION

An object of the present invention is to provide a Ti—Al-based heat-resistant member in which only the surface thereof is increased in hardness while satisfactorily maintaining the mechanical properties of the inside thereof.

Another object of the invention is to provide a Ti—Al-based heat-resistant member in which only the surface thereof is increased in hardness without causing an increase in the amount of starting points for surface fracture or an increase in production cost.

A further object of the invention is to apply the invention to a turbine wheel, which is one form of the Ti—Al-based heat-resistant member, and to improve the durability of the turbine wheel by controlling the crystal grain diameter.

The Ti—Al-based heat-resistant member according to the present invention has the following configurations in order to solve the above-mentioned problems.

(1) A Ti—Al-based heat-resistant member including a Ti—Al-based alloy which includes:

28.0 mass % to 35.0 mass % of Al;

1.0 mass % to 15.0 mass % of at least one selected from the group consisting of Nb, Mo, W and Ta;

0.1 mass % to 5.0 mass % of at least one selected from the group consisting of Cr, Mn and V; and 0.1 mass % to 1.0 mass % of Si, with the balance being Ti and unavoidable impurities, in which a whole or a part of a surface of the Ti—Al-based heat-resistant member includes a hardened layer as a surface layer, said hardened layer having a higher hardness than an inside of the Ti—Al-based heat-resistant member, and the Ti—Al-based heat-resistant member has a hardness ratio represented by the following expression (a) of 1.4 to 2.5:

$$\text{Hardness ratio} = HV_S/HV_I \quad (a)$$

in which $HV_S$ is a hardness of the surface layer and is a Vickers hardness measured at a site located at a distance of 0.02 mm±0.005 mm from the surface of the Ti—Al-based heat-resistant member (load: 0.98 N), and $HV_I$ is a hardness of the inside of the Ti—Al-based heat-resistant member and is a Vickers hardness measured at a site located at a distance of 0.50 mm±0.10 mm from the surface of the Ti—Al-based heat-resistant member (load: 0.98 N).

(2) The Ti—Al-based heat-resistant member according to (1), in which the Ti—Al-based alloy further includes from 0.01 mass % to 0.2 mass % of C.

(3) The Ti—Al-based heat-resistant member according to (1) or (2), in which the Ti—Al-based alloy further includes from 0.005 mass % to 0.200 mass % of B.

(4) The Ti—Al-based heat-resistant member according to any one of (1) to (3), in which the hardened layer has a hardened layer depth, which is a distance from the surface of the Ti—Al-based heat-resistant member to a site where the hardness is $(HV_S+HV_I)/2$, of 0.03 to 0.25 mm.

(5) The Ti—Al-based heat-resistant member according to any one of (1) to (4), in which the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

(6) The Ti—Al-based heat-resistant member according to any one of (1) to (5), in which the inside of the Ti—Al-based heat-resistant member has a $\gamma(TiAl)/\alpha_2(Ti_3Al)$ lamellar structure.

(7) The Ti—Al-based heat-resistant member according to any one of (1) to (6), which is a turbine wheel.

(8) The Ti—Al-based heat-resistant member according to (7), in which a surface layer of a wing part of the turbine wheel has an average crystal grain diameter of 10 to 50 μm and has an equi-axed grain structure having random crystal orientation.

(9) The Ti—Al-based heat-resistant member according to (8), in which an inside of the wing part of the turbine wheel has an average crystal grain diameter of 100 to 500 μm and has an equi-axed grain structure having random crystal orientation.

The components of a melt are regulated so that a β (βTi) phase is precipitated as primary crystals. Subsequently, the melt is poured into a casting mold. In this operation, the rate of cooling during the period in which the surface layer experiences a solid-liquid region is controlled so as to be within a given range and, as a result, the thickness of the primary-crystal β phase to be formed in the surface layer can be controlled. With the progress of cooling, the primary-crystal β phase soon becomes an α (αTi) phase, which has a relatively low Al content. With the further progress of cooling, the α phase becomes a lamellar structure configured of an $\alpha_2$ ($Ti_3Al$) phase and a γ (TiAl) phase. Since the primary-crystal β phase has a lower Al content than the melt components, the surface layer has a higher $\alpha_2$ phase content than the inside.

Meanwhile, after the primary-crystal β phase has precipitated in the surface layer, the inside solidifies. The inside is mainly constituted of an α phase in which the melt components are substantially reflected, that is, an α phase having a higher Al content than the surface layer. With the further progress of cooling, the α phase in the inside becomes a lamellar structure configured of an $\alpha_2$ phase and a γ phase. Since the α phase in the inside has a relatively high Al content, the inside has a lower $\alpha_2$ phase content than the surface layer.

The hardness of a Ti—Al-based alloy depends on the content of an $\alpha_2$ phase; the higher the content of the $\alpha_2$ phase, the higher the hardness. Consequently, by optimizing the melt components and the cooling rate during a solid-liquid region, the surface only can be increased in hardness while satisfactorily maintaining the mechanical properties of the inside. In addition, since no surface treatment is necessary, the surface only can be increased in hardness without causing an increase in the amount of starting points for surface fracture or an increase in production cost.

DETAILED DESCRIPTION OF THE INVENTION

Figure 1A:
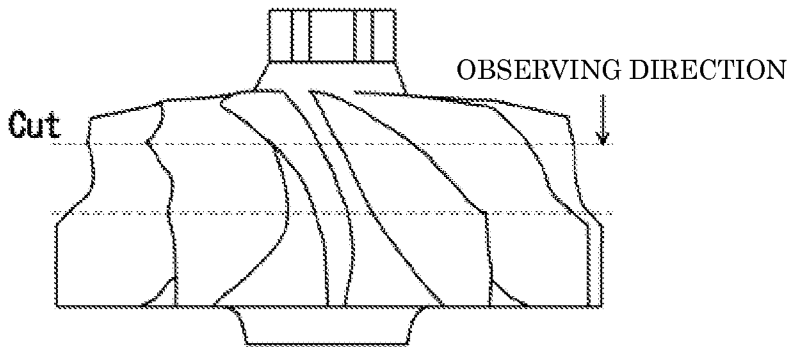
FIGS. 1A to 1C are schematic views for illustrating a method for measuring hardness.

Embodiments of the present invention are explained below in detail.

[1. Ti—Al-based Heat-resistant Member]

The Ti—Al-based heat-resistant member according to the invention has the following configurations:

A Ti—Al-based heat-resistant member including a Ti—Al-based alloy which includes:

28.0 mass % to 35.0 mass % of Al;

1.0 mass % to 15.0 mass % of at least one selected from the group consisting of Nb, Mo, W and Ta;

0.1 mass % to 5.0 mass % of at least one selected from the group consisting of Cr, Mn and V; and 0.1 mass % to 1.0 mass % of Si, with the balance being Ti and unavoidable impurities, in which a whole or a part of a surface of the Ti—Al-based heat-resistant member includes a hardened layer as a surface layer, said hardened layer having a higher hardness than an inside of the Ti—Al-based heat-resistant member, and the Ti—Al-based heat-resistant member has a hardness ratio represented by the following expression (a) of 1.4 to 2.5:

$$\text{Hardness ratio}=HV_S/HV_I \qquad (a)$$

in which $HV_S$ is a hardness of the surface layer and is a Vickers hardness measured at a site located at a distance of 0.02 mm±0.005 mm from the surface of the Ti—Al-based heat-resistant member (load: 0.98 N), and $HV_I$ is a hardness of the inside of the Ti—Al-based heat-resistant member and is a Vickers hardness measured at a site located at a distance of 0.50 mm±0.10 mm from the surface of the Ti—Al-based heat-resistant member (load: 0.98 N).

[1.1. Ti—Al-Based Alloy]

The Ti—Al-based heat-resistant member according to the invention includes a Ti—Al-based alloy. The Ti—Al-based alloy includes the following elements, with the balance being Ti and unavoidable impurities. The kinds of the elements to be added, ranges of the contents of the components, and reasons for limiting the contents are as follows. In the following explanations on component content ranges, the contents of the respective components indicate an average composition of the whole material. Incidentally, the content of each component is shown in terms of mass %, and "mass %" is the same as "wt %".

[1.1.1. Major Constituent Elements]

$$28.0 \text{ mass } \% \leq Al \leq 35.0 \text{ mass } \% \quad (1)$$

Al is an essential element which constitutes intermetallic compounds γ(TiAl) and $\alpha_2(Ti_3Al)$ together with Ti. In case where the content of Al is too low, the $\alpha_2$ phase is yielded in an excess amount. As a result, the inside not only has reduced ductility and toughness but also has poor oxidation resistance. Consequently, the content of Al must be 28 mass % or higher. The content of Al is preferably 30.0 mass % or higher, more preferably 31.0 mass % or higher.

For obtaining high strength and high toughness in the $\gamma/\alpha_2$ lamellar structure, it is necessary to regulate the $\alpha_2$ volume ratio of the inside to a value in a given range. Meanwhile, for heightening the hardness of the surface layer, it is necessary to crystallize out a β phase as primary crystals and to grow these crystals during solidification. In case where the content of Al is excessively high, a γ single phase is formed, resulting in an $Al_3Ti$ phase yielded in an increased amount or making it difficult to crystallize out a β phase as primary crystals. Consequently, the content of Al must be 35.0 mass % or less. The content of Al is preferably 34.0 mass % or less, more preferably 32.0 mass % or less.

$$1.0 \text{ mass } \% \leq Nb+Mo+W+Ta \leq 15.0 \text{ mass } \% \text{ (i.e., 1.0 mass % to 15.0 mass % of at least one selected from the group consisting of Nb, Mo, W and Ta)} \quad (2)$$

"Nb+Mo+W+Ta" indicates the total content of Nb, Mo, W and Ta (hereinafter referred to also as "Nb and the like"). The expression given above shows that any one of Nb and the like may be contained or two or more thereof may be contained, so long as the total content thereof is within that range (Nb≥0 mass %; Mo≥0 mass %; W≥0 mass %; Ta≥0 mass %).

Nb and the like are elements effective in improving the oxidation resistance of Ti—Al-based materials. Addition of Nb and the like in combination with Si further improves the oxidation resistance as compared with the case where Nb and the like are added alone. Furthermore, since Nb and the like are introduced into Ti sites to form a solid solution, these elements have the effect of increasing the hardness of the $\alpha_2$ phase, which increases the surface hardness. For obtaining these effects, the total content of Nb and the like must be 1.0 mass % or higher. The total content thereof is preferably 4.0 mass % or higher, more preferably 7.0 mass % or higher.

Meanwhile, in case where the total content thereof is excessively high, a soft B2 phase is formed and the effect of increasing the surface hardness hence comes not to be enhanced anymore. In addition, since Nb and the like have high melting points and are expensive elements, addition thereof in more than a necessary amount arouses problems concerning manufacturability and material cost. Consequently, the total content of Nb and the like must be 15.0 mass % or less. The total content thereof is preferably 10.0 mass % or less, more preferably 8.0 mass % or less.

$$0.1 \text{ mass } \% \leq Cr+Mn+V \leq 5.0 \text{ mass } \% \text{ (i.e., 0.1 mass % to 5.0 mass % of at least one selected from the group consisting of Cr, Mn and V)} \quad (3)$$

"Cr+Mn+V" indicates the total content of Cr, Mn and V (hereinafter referred to also as "Cr and the like"). The expression shows that any one of Cr and the like may be contained or two or more thereof may be contained, so long as the total content thereof is within that range (Cr≥0 mass %; Mn≥0 mass %; V≥0 mass %).

Cr and the like form a solid solution in both the γ phase and the $\alpha_2$ phase but, in particular, are elements which form a solid solution in the γ phase. The formation of a solid solution thereof in the γ phase increases the hardness by solid-solution strengthening. For obtaining this effect, the total content of Cr and the like must be 0.1 mass % or higher. The total content thereof is preferably 0.5 mass % or higher, more preferably 0.8 mass % or higher.

Meanwhile, in case where the total content thereof is excessively high, that effect comes not to be enhanced anymore. In addition, a greater influence is exerted on a deterioration in oxidation resistance. Consequently, the total content thereof must be 5.0 mass % or less. The total content thereof is preferably 3.0 mass % or less, more preferably 1.5 mass % or less.

$$0.1 \text{ mass } \% \leq Si \leq 1.0 \text{ mass } \% \quad (4)$$

Si is an element which is exceedingly effective in improving the oxidation resistance of Ti—Al-based materials and in improving creep properties by the precipitation of Ti—Si-based compounds. Furthermore, Si improves the high-temperature stability of the lamellar structure in an as-cast state. In addition, Si lowers the melting point of the melt and hence renders structural control during solidification easy. For obtaining these effects, the content of Si must be 0.1 mass % or higher. The content of Si is preferably 0.2 mass % or higher, more preferably 0.3 mass % or higher.

Meanwhile, in case where the content of Si is excessively high, an α phase is prone to crystallize out as primary crystals. Consequently, the content of Si must be 1.0 mass % or less. The content of Si is preferably 0.7 mass % or less, more preferably 0.5 mass % or less.

[1.1.2. Minor Constituent Elements]

The Ti—Al-based alloy may further contain one or more of the following minor constituent elements, besides the major constituent elements described above. The kinds of elements which may be added, ranges of the contents of the components, and reasons for limiting the contents are as follows. In the following explanations on component content ranges, the contents of the respective components indicate an average composition of the whole material.

$$0.01 \text{ mass } \% \leq C \leq 0.2 \text{ mass } \% \quad (5)$$

C forms a solid solution in both the γ phase and the $\alpha_2$ phase, and serves to strengthen these phases, thereby heightening the hardness. From the standpoint of obtaining this effect, it is preferable that the content of C is 0.01 mass % or higher. The content of C is more preferably 0.03 mass % or higher, even more preferably 0.06 mass % or higher.

Meanwhile, in case where the content of C is excessively high, the effect comes not to be enhanced anymore and a decrease in ductility results. Consequently, it is preferable that the content of C is 0.2 mass % or less. The content of C is more preferably 0.15 mass % or less, even more preferably 0.12 mass % or less.

$$0.005 \text{ mass } \% \leq B \leq 0.200 \text{ mass } \% \quad (6)$$

B has the effect of fining the crystal grains of the $\gamma/\alpha_2$ lamellar structure and further has the effect of heightening the hardness of the surface. In addition, B improves castability and, hence, renders structural control during solidification easy. From the standpoint of obtaining these effects, it is preferable that the content of B is 0.005 mass % or higher. The content of B is more preferably 0.01 mass % or higher, even more preferably 0.02 mass % or higher.

Meanwhile, in case where the content of B is excessively high, $TiB_2$, which is a boride, precipitates in a large amount to reduce the strength and toughness. Consequently, it is preferable that the content of B is 0.200 mass % or less. The content of B is more preferably 0.150 mass % or less, even more preferably 0.100 mass % or less.

$$O \leq 0.3 \text{ mass } \% \text{ and } N \leq 0.2 \text{ mass } \% \quad (7)$$

O and N form a solid solution in both the γ phase and the $\alpha_2$ phase to affect strengthening. However, excessively high contents thereof result in a decrease in ductility. It is therefore preferable that the contents of these elements as unavoidable impurities are such that O≤0.3 mass % and N≤0.2 mass %.

[1.2. Hardened Layer]

The surface of the Ti—Al-based heat-resistant member according to the present invention includes a hardened layer. The Ti—Al-based heat-resistant member may be one in which the surface thereof is wholly covered with the hardened layer, or one in which a part of the surface is covered with the hardened layer.

The term “hardened layer” means a region formed as a surface layer in the Ti—Al-based heat-resistant member and having a higher hardness than the inside of the Ti—Al-based heat-resistant member.

[1.2.1. Hardness Ratio]

The Ti—Al-based heat-resistant member according to the present invention must have a hardness ratio, as represented by the following expression (a), of 1.4 to 2.5:

$$\text{Hardness ratio} = HV_S/HV_I \quad (a)$$

in which $HV_S$ is a hardness of the surface layer and is a Vickers hardness measured at a site located at a distance of 0.02 mm±0.005 mm from the surface of the Ti—Al-based heat-resistant member (load: 0.98 N), and $HV_I$ is a hardness of the inside of the Ti—Al-based heat-resistant member and is a Vickers hardness measured at a site located at a distance of 0.50 mm±0.10 mm from the surface of the Ti—Al-based heat-resistant member (load: 0.98 N).

Increasing the proportion of the $\alpha_2$ phase in the whole material increases the hardness of the whole material but reduces the mechanical properties (in particular, toughness) of the whole material. Meanwhile, reducing the proportion of the $\alpha_2$ phase in the whole material reduces the hardness of the whole material although this material as a whole shows sufficient mechanical properties.

In contrast, by increasing the $\alpha_2$ volume ratio of a surface layer part as compared with that of the inside, the surface layer only can be hardened while satisfactorily maintaining the mechanical properties of the inside.

In case where the hardness ratio is excessively low (that is, the hardness of the surface layer is excessively low), sufficient mechanical properties are not obtained. Consequently, the hardness ratio must be 1.4 or higher. The hardness ratio is preferably 1.6 or higher, more preferably 1.8 or higher.

Meanwhile, in case where the hardness ratio is excessively high (that is, the hardness of the surface layer is excessively high), surface fracture is rather prone to occur. Consequently, the hardness ratio must be 2.5 or less. The hardness ratio is preferably 2.4 or less, more preferably 2.2 or less.

By optimizing the components and the production conditions, the hardness of the surface layer ($HV_S$) is regulated to at least HV 450, or at least HV 500, or at least HV 600.

Likewise, by optimizing the components and the production conditions, the hardness of the inside ($HV_I$) is regulated to at most HV 400, or at most HV 300.

[1.2.2. Hardened Layer Depth]

The term “hardened layer depth” means the distance from the surface to a site where the hardness is $(HV_S+HV_I)/2$ (or to a site where the hardness is $HV_S-0.5(HV_S-HV_I)$).

As will be described later, by regulating the cooling rate for cooling a surface layer in a solid-liquid region when the melt is solidified, the size of the primary-crystal β phase, i.e., the hardened layer depth, can be controlled.

In case where the hardened layer depth is too small, the Ti—Al-based heat-resistant member has reduced mechanical properties. Consequently, it is preferable that the hardened layer depth is 0.03 mm or larger. The hardened layer depth is more preferably 0.05 mm or larger, even more preferably 0.08 mm or larger.

Meanwhile, even when the hardened layer depth is increased to an unnecessarily large value, the effect is the same and no actual advantage is brought about. In addition, in case where the hardened layer depth is excessively increased, surface fracture is prone to occur. Consequently, it is preferable that the hardened layer depth is 0.25 mm or less. The hardened layer depth is more preferably 0.20 mm or less, even more preferably 0.15 mm or less.

[1.2.3. $\alpha_2$ Volume Ratio]

[1.2.3.1. Definition]

The term “$\alpha_2$ volume ratio (% by volume)” means a value obtained by photographing five fields of view in an SEM at a magnification of 3,000 times to obtain backscattered electron images, determining the total area (ΣS) of the $\alpha_2$ phase (regions which look white) contained in the fields of view, and dividing this total area by the total area of the fields of view ($\Sigma S_0$).

The term “$\alpha_2$ volume ratio of the hardened layer” means the volume ratio of an $\alpha_2$ phase measured at a site located at a distance of 0.02 mm±0.005 mm from the surface of the Ti—Al-based heat-resistant member.

The term “$\alpha_2$ volume ratio of the inside” means the volume ratio of an $\alpha_2$ phase measured at a site located at a distance of 0.50 mm±0.10 mm from the surface of the Ti—Al-based heat-resistant member.

[1.2.3.2. $\alpha_2$ Volume Ratio of the Hardened Layer]

Since the $\alpha_2$ phase is harder than the γ phase, the hardness of the $\gamma/\alpha_2$ lamellar structure increases as the content of the $\alpha_2$ phase becomes higher. From the standpoint of strengthening the surface layer of the Ti—Al-based heat-resistant member thereby improving the mechanical properties of the Ti—Al-based heat-resistant member, it is preferable that the $\alpha_2$ volume ratio of the hardened layer is 30% by volume or higher. The $\alpha_2$ volume ratio of the hardened layer is more preferably 35% by volume or higher, even more preferably 40% by volume or higher.

The higher the $\alpha_2$ volume ratio of the hardened layer, the more the hardened layer is preferred so long as the desired Ti—Al-based heat-resistant member can be produced. However, too high $\alpha_2$ volume ratio of the hardened layer results in a decrease in toughness or ductility and a deterioration in oxidation resistance. Consequently, it is preferable that the $\alpha_2$ volume ratio of the hardened layer is 60% by volume or less. The $\alpha_2$ volume ratio of the hardened layer is more preferably 55% by volume or less, even more preferably 50% by volume or less.

[1.2.3.3. $\alpha_2$ Volume Ratio of the Inside]

In case where the $\alpha_2$ volume ratio of the inside is too low, sufficient strength is not obtained. Consequently, it is preferable that the $\alpha_2$ volume ratio of the inside is 5% by volume or higher. The $\alpha_2$ volume ratio of the inside is more preferably 10% by volume or higher, even more preferably 15% by volume or higher.

Meanwhile, in case where the $\alpha_2$ volume ratio of the inside is too high, this material is considerably brittle and has reduced toughness. It is hence preferable that the $\alpha_2$ volume ratio of the inside is less than 30% by volume. The $\alpha_2$ volume ratio of the inside is more preferably 25% by volume or less, even more preferably 20% by volume or less.

[1.3. Structure of the Inside of the Ti—Al-Based Heat-Resistant Member]

From the standpoint of high-temperature strength, it is preferable that the structure of the inside of the Ti—Al-based heat-resistant member is a $\gamma$(TiAl)/$\alpha_2$($Ti_3Al$) lamellar structure. A Ti—Al-based heat-resistant member having excellent mechanical properties is obtained by hardening a surface layer only while maintaining the $\gamma/\alpha_2$ lamellar structure of the inside of the Ti—Al-based heat-resistant member.

[1.4. Examples of the Ti—Al-Based Heat-Resistant Member]

The Ti—Al-based heat-resistant member according to the present invention can be used in various applications.

Examples of the Ti—Al-based heat-resistant member include:

(1) turbine wheels for use in, for example, the automotive turbochargers;

(2) LPT (low pressure turbine) blades for the jet engines of airplanes; and (3) automotive engine valves.

[1.5. Properties as the Turbine Wheel]

The turbine wheel repeatedly undergoes acceleration/deceleration in accordance with accelerator on-off operations, while rotating at a high temperature and a high speed. During the rotation, bending stress is imposed on the surface layer of each wing part and centrifugal force is imposed on the whole wing parts.

The finer the crystal grains, the higher the flexural strength. It is therefore preferable that the crystal grains in the surface layer of the wing part are fine grains. In particular, by regulating the average crystal grain diameter of the surface layer of the wing part to 10 to 50 μm, high flexural strength can be obtained. The average crystal grain diameter of the surface layer of the wing part is preferably 12 to 45 μm, more preferably 15 to 40 μm.

The term “surface layer of the wing part” herein means a portion ranging from the surface to a depth of 50 μm therefrom.

Meanwhile, for enabling the wing parts to withstand the centrifugal force imposed on the whole wing parts, it is important to improve the strength of the inside of each wing part. Fine crystal grains are not always preferred from the standpoint of improving high-temperature strength. By regulating the average crystal grain diameter of the inside of each wing part to 100 to 500 μm, high high-temperature strength can be obtained. The average crystal grain diameter of the inside of each wing part is preferably 150 to 450 μm, more preferably 200 to 400 μm.

The term “inside of each wing part” means a portion ranging from a depth of 200 μm from the surface to the center of the wing part.

From the standpoint of stabilizing the properties of the turbine wheel, it is preferable that the surface layer and the inside of each wing part both have an entirely lamellar structure and an equi-axed grain structure having random crystal orientation.

[2. Process for Producing the Ti—Al-Based Heat-Resistant Member]

The Ti—Al-based heat-resistant member according to the present invention can be produced by the following process.

[2.1. Melting Step]

First, raw materials are mixed together so as to result in the composition described above, and melted (melting step).

Methods for melting the raw materials are not particularly limited, and any method capable of yielding an even melt may be used. Examples of the melting methods include a levitation melting method, vacuum induction melting method, and plasma skull melting method.

[2.2. Casting Step]

Next, the melt is poured into a casting mold. In the present invention, since the components of the melt have been optimized, a β phase crystallizes out as primary crystals. The primary-crystal β phase has a lower Al content than the material components and hence forms, through solidification, a lamellar structure having a high $\alpha_2$ content, thereby contributing to an improvement in hardness.

In case where the cooling rate in the region where a β phase and a liquid phase coexist (solid-liquid region; see FIG. 11) is too high, the primary-crystal β phase does not sufficiently grow in the surface layer. From the standpoint of obtaining a given hardened layer depth, it is preferable that the rate of cooling the surface layer in the solid-liquid region is 1° C./s or higher. The cooling rate is more preferably 5° C./s or higher, even more preferably 10° C./s or higher.

Meanwhile, in case where the cooling rate in the solid-liquid region is too low, element diffusion occurs during the cooling although the primary-crystal β phase sufficiently grows in the surface layer. Because of this, the components are homogenized and an $\alpha_2$ phase, which contributes to hardness, is not sufficiently formed, resulting in an only slight improvement in hardness. It is therefore preferable that the cooling rate is 50° C./s or less. The cooling rate is more preferably 45° C./s or less, even more preferably 40° C./s or less.

In turbine wheels, the rate of solidification affects the crystal grain diameter. The turbine wheel produced using the cooling rate in the solid-liquid region can have satisfactory durability since the surface layer and the inside of each wing part have average crystal grain diameters respectively within the ranges shown above.

There are no particular limitations on the cooling rate to be used after the temperature of the surface layer has passed through the solid-liquid region, that is, after a primary-crystal β phase has been formed in the surface layer in a given thickness. However, in case where the cooling is conducted unnecessarily slowly, element diffusion occurs during the cooling and the components are homogenized. It is therefore preferable that the cooling rate after the temperature of the surface layer has passed through the solid-liquid region is 1° C./s or higher. After the cooling, the cast member is taken out from the casting mold.

[2.3. HIP Treatment Step]

Next, the cast member is subjected to an HIP treatment according to need (HIP treatment step). Although an HIP treatment is not always necessary, internal casting defects disappear through the HIP treatment, resulting in an improvement in reliability. Conditions for the HIP treatment are not particularly limited, and optimal conditions can be selected according to purposes.

[2.4. Processing Step]

The cast member or the cast member which has undergone the HIP treatment is then subjected to machining (processing step) according to need. Methods for the processing are not particularly limited, and optimal methods can be selected according to purposes. The post-processing may be omitted in the case where the post-processing is substantially unnecessary.

[3. Mechanism]

Figure 11:
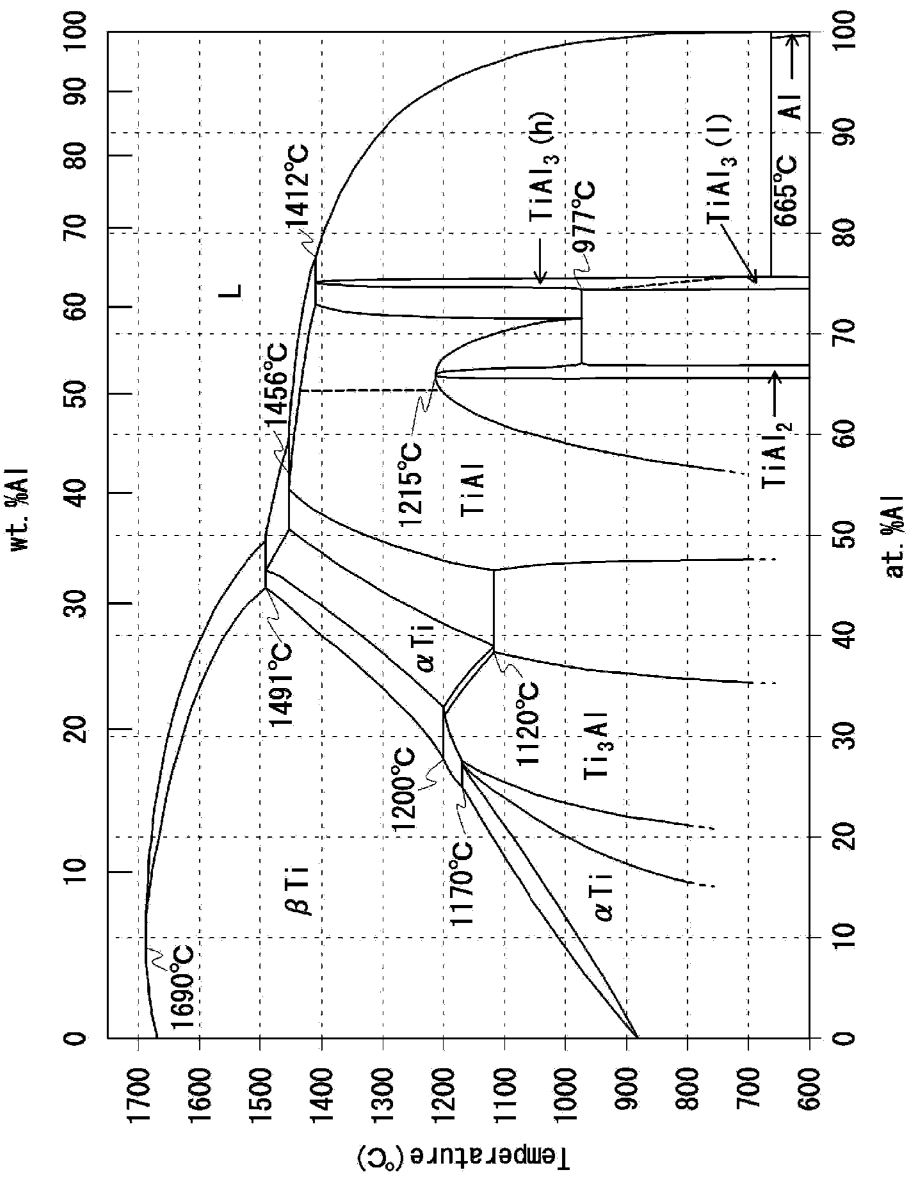
FIG. 11 is a phase diagram of a Ti—Al binary system.

FIG. 11 shows α phase diagram of a Ti—Al binary system. First, the components of a melt are regulated so that a β (βTi) phase is precipitated as primary crystals. Subsequently, the melt is poured into a casting mold.

In this operation, the rate of cooling during the period in which the surface layer experiences a solid-liquid region is controlled so as to be within a given range and, as a result, the thickness of the primary-crystal β phase to be formed in the surface layer can be controlled. With the progress of cooling, the primary-crystal β phase soon becomes an α (αTi) phase, which has a relatively low Al content. With the further progress of cooling, the α phase becomes a lamellar structure configured of an $\alpha_2$ ($Ti_3Al$) phase and a γ (TiAl) phase. Since the primary-crystal β phase has a lower Al content than the melt components, the surface layer has a higher $\alpha_2$ phase content than the inside.

Meanwhile, after the primary-crystal β phase has precipitated in the surface layer, the inside solidifies. The inside is mainly constituted of an α phase in which the melt components are substantially reflected, that is, an α phase having a higher Al content than the surface layer. With the further progress of cooling, the α phase in the inside becomes a lamellar structure configured of an $\alpha_2$ phase and a γ phase. Since the α phase in the inside has a relatively high Al content, the inside has a lower $\alpha_2$ phase content than the surface layer.

The hardness of a Ti—Al-based alloy depends on the content of an $\alpha_2$ phase; the higher the content of the $\alpha_2$ phase, the higher the hardness. Consequently, by optimizing the melt components and the cooling rate during a solid-liquid region, the surface only can be increased in hardness while satisfactorily maintaining the mechanical properties of the inside. In addition, since no surface treatment is necessary, the surface only can be increased in hardness without causing an increase in the amount of starting points for surface fracture or an increase in production cost.

In the case where the Ti—Al-based alloy is used to produce a rotator, the wear resistance of the sliding portion thereof can be improved by forming a hardened layer in the surface of the sliding portion.

It is possible to form a hardened layer in any desired portion by regulating the casting conditions. For example, in the case of a turbine wheel, a hardened layer can be formed only on the root portion of the wing part, which are required to have surface strength, and on the wing surface, which is required to have erosion resistance.

Furthermore, in the case of a turbine wheel, the durability thereof can be improved by controlling the crystal grain diameter of the surface layer and the inside of each wing part, in addition to the formation of a hardened layer in the surface.

EXAMPLES

Examples 1 to 17 and Comparative Examples 1 to 6

1. Production of Samples

As raw materials, pure Ti, particulate Al, and pure metals or alloys of other metallic elements were used. The raw materials were melted in a water-cooled copper crucible, and a turbine wheel having an outer diameter of 50 mm was produced therefrom by casting.

With respect to Comparative Example 6, carbonizing was conducted after the casting.

2. Test Methods

2.1. Hardness Measurement

Figure 1B:
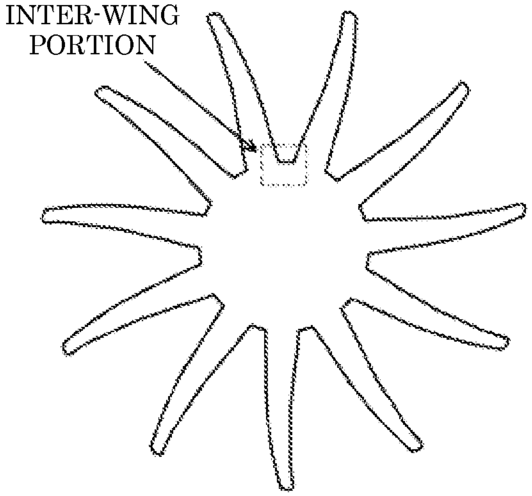
Figure 1C:
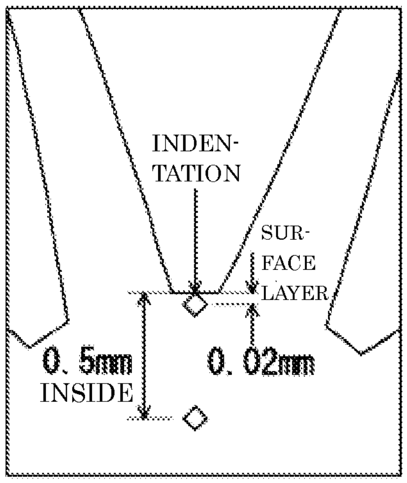

FIG. 1A shows a front view of the turbine wheel. FIG. 1B shows a plan view of a portion cut out of the turbine wheel. FIG. 1C shows an enlarged view of an inter-wing portion.

First, the turbine wheel was cut at a nearly central portion thereof along a direction perpendicular to the axis (FIG. 1A). Subsequently, a surface layer (a site located at a distance of 0.02 mm±0.005 mm from the surface) and the inside (a site located at a distance of 0.50 mm±0.10 mm from the surface) of an inter-wing portion were examined for Vickers hardness (FIG. 1B and FIG. 1C), under such conditions that the number of specimens for each sample was 5 and the load was 100 gf (0.98 N).

Furthermore, a hardness ratio was determined from the hardness of the surface layer $HV_S$ and the hardness of the inside $HV_I$.

2.2. $\alpha_2$ Volume Ratio

Figure 2A:
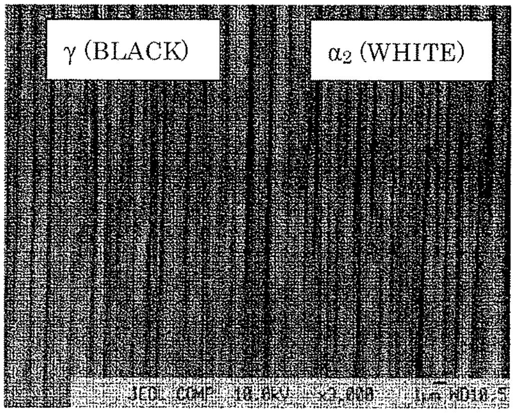
FIGS. 2A and 2B are a backscattered electron image of a surface layer part (FIG. 2A) and a backscattered electron image of the inside (FIG. 2B).
Figure 2B:
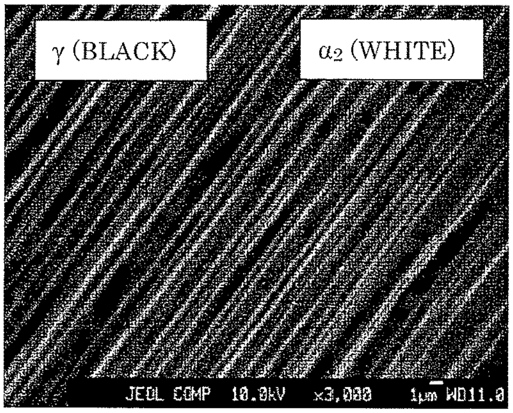

Backscattered electron images of the surface layer and inside of the inter-wing portion were photographed. FIG. 2A shows an example of the backscattered electron images of the surface layer part. FIG. 2B shows an example of the backscattered electron images of the inside. The magnification was 3,000 times, and five fields of view were photographed with respect to each sample. The $\alpha_2$ phase volume ratio was determined from a difference in contrast between the γ phase, which looked black, and the $\alpha_2$ phase, which looked white.

2.3. Strengths

2.3.1. Flexural Strength

Figure 3A:
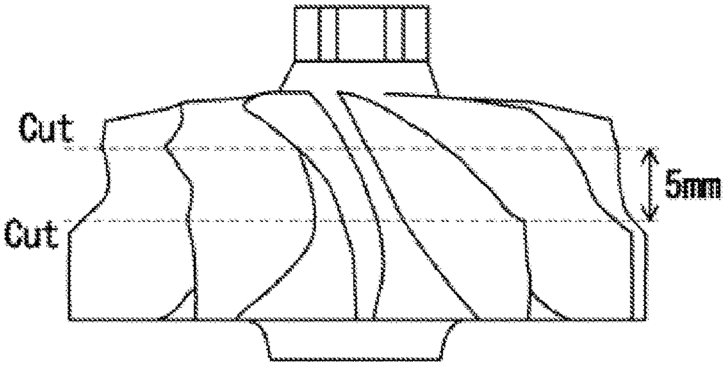
FIGS. 3A to 3C are schematic views for illustrating a method for measuring flexural strength.
Figure 3B:
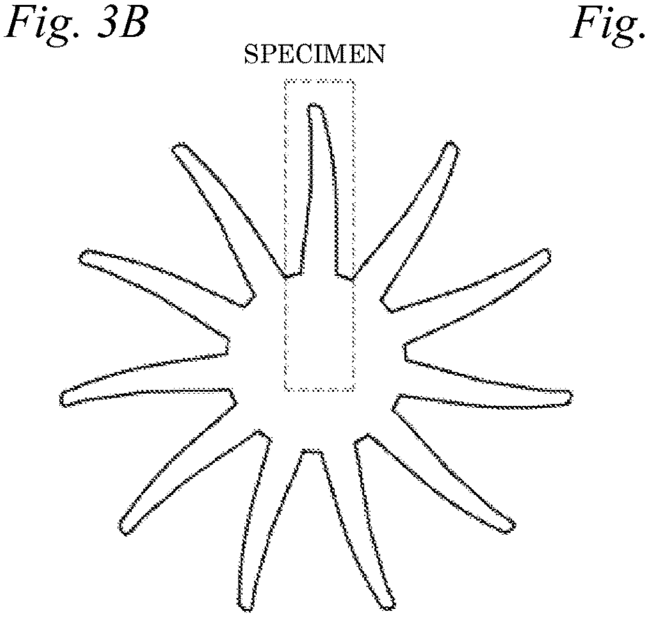
Figure 3C:
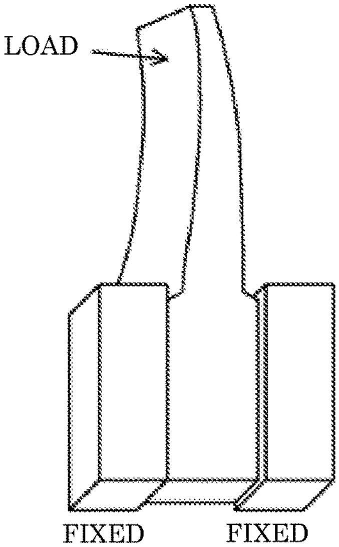

FIG. 3A shows a front view of the turbine wheel. FIG. 3B shows a plan view of a portion cut out of the turbine wheel. FIG. 3C shows a specimen cut out of the turbine wheel.

First, the turbine wheel was cut out at a nearly central portion thereof along a direction perpendicular to the axis (FIG. 3A). A specimen for flexural strength evaluation was cut out of the member thus cut out (FIG. 3B). Furthermore, the root portion of the specimen was fixed with a jig, and a flexural load was imposed on the tip of the wing (FIG. 3C).

The test was conducted at room temperature, the number of specimens for each sample being 3.

2.3.2. Tensile Strength

Figure 4A:
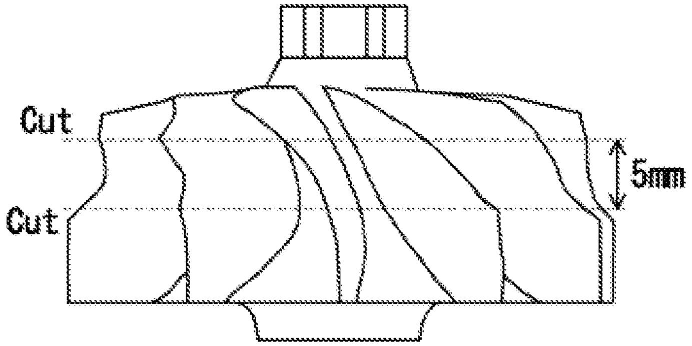
FIGS. 4A to 4C are schematic views for illustrating a method for measuring tensile strength.
Figure 4B:
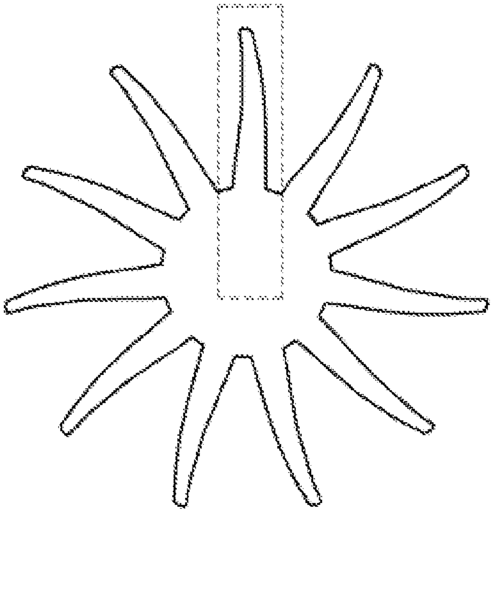
Figure 4C:
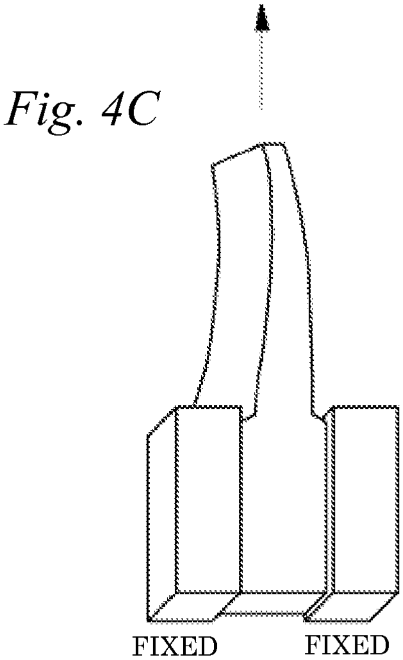

The same specimen as that in the flexural test was used in the tensile test, and a tensile load was imposed thereon on the supposition of the centrifugal force to be imposed on the wings (see FIG. 4). The test was conducted at room temperature, the number of specimens for each sample being 3.

2.4. Hardened Layer Depth

Figure 5:
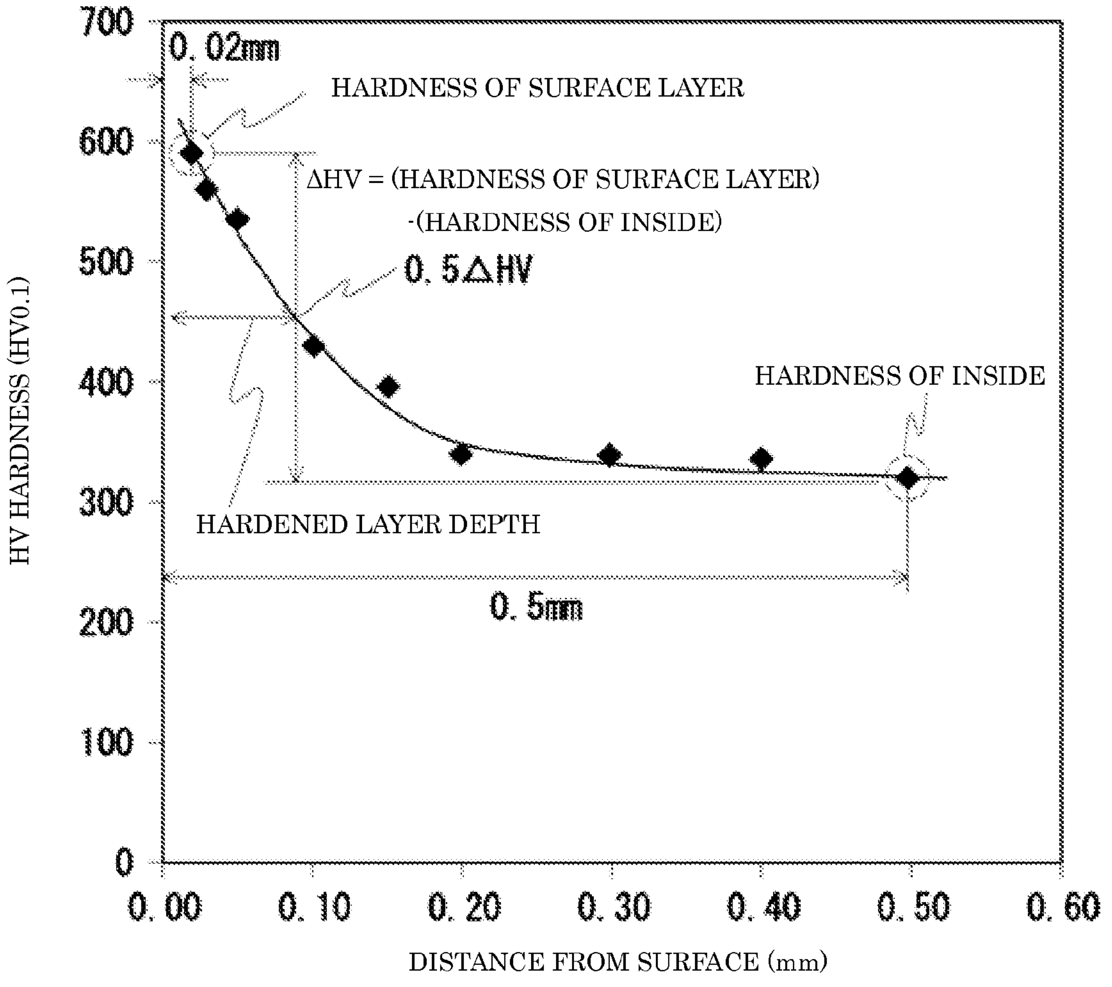
FIG. 5 is a chart for illustrating a method for determining the hardened layer depth.

FIG. 5 shows one example of methods for determining the hardened layer depth. The area ranging from a surface layer (0.02 mm±0.005 mm) to the inside (0.50 mm±0.10 mm) was examined for Vickers hardness at given intervals, under the conditions of load=100 gf (0.98 N). The difference ΔHV (=$HV_S$−$HV_I$) between the hardness of the surface layer $HV_S$ and the hardness of the inside $HV_I$ was determined, and a site where the hardness was higher by 0.5ΔHV than that of the inside (that is, a site having a hardness of ($HV_S$+$HV_I$)/2) was determined. Furthermore, the distance (hardened layer depth) from the surface to the site was determined.

2.5. EPMA

The Al content of the inter-wing portion was determined by EPMA.

2.6. Crystal Grain Size

The sample was mirror-polished and then corroded to render the crystalline structure viewable. With respect to each of a surface layer and an inside of the wing part, the size of lamellar grains was determined in terms of crystal grain diameter.

For the determination of crystal grain diameter, the structure was photographed with an optical microscope at a magnification of 100 times, and a cutting method in which the crystal grain diameter was calculated from the number of crystal grains through which a straight line having arbitrary length passed was used.

2.7. Durability Test

As turbine wheel evaluation, a real rotation test was performed. The test was conducted at an exhaust gas temperature of 950° C. and a rotation speed of 200,000 rpm. Acceleration and deceleration were repeated, and the durability was evaluated on the basis of whether or not the turbine wheel broke in 10 hours.

3. Results

The components, production conditions, and results are shown in Table 1 and Table 2.

Figure 6:
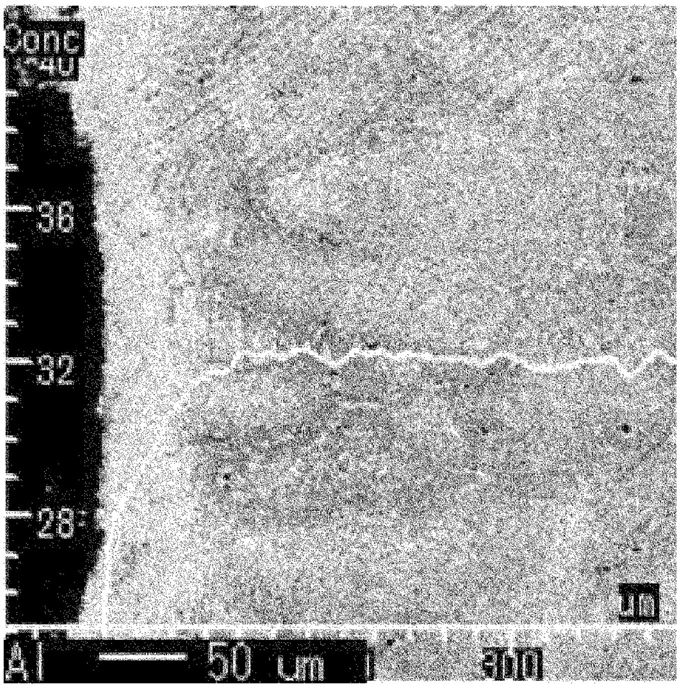
FIG. 6 is the results of EPMA of an inter-wing portion.
Figure 7:
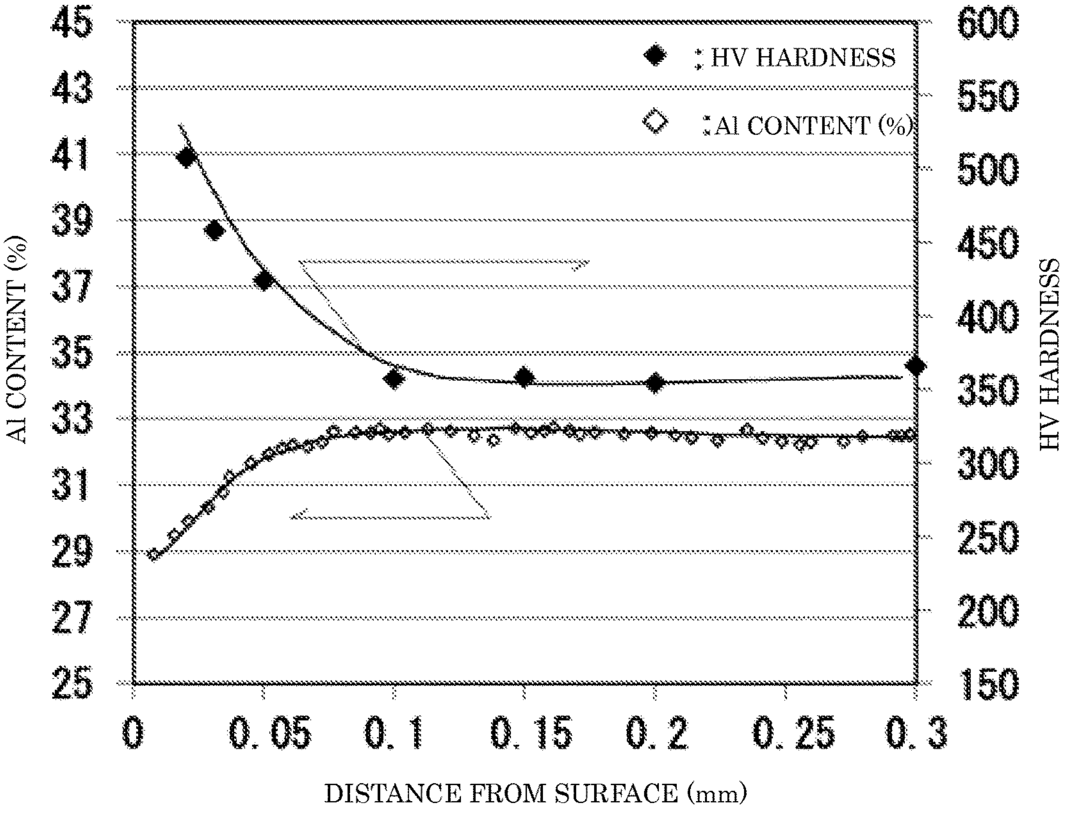
FIG. 7 is a chart which shows a relationship between the distance from surface and Al content and a relationship between the distance from surface and Vickers hardness HV.

FIG. 6 shows the results of the EPMA of an inter-wing portion. FIG. 7 shows a relationship between the distance from the surface and the content of Al and a relationship between the distance from the surface and the Vickers hardness HV.

Figure 8:
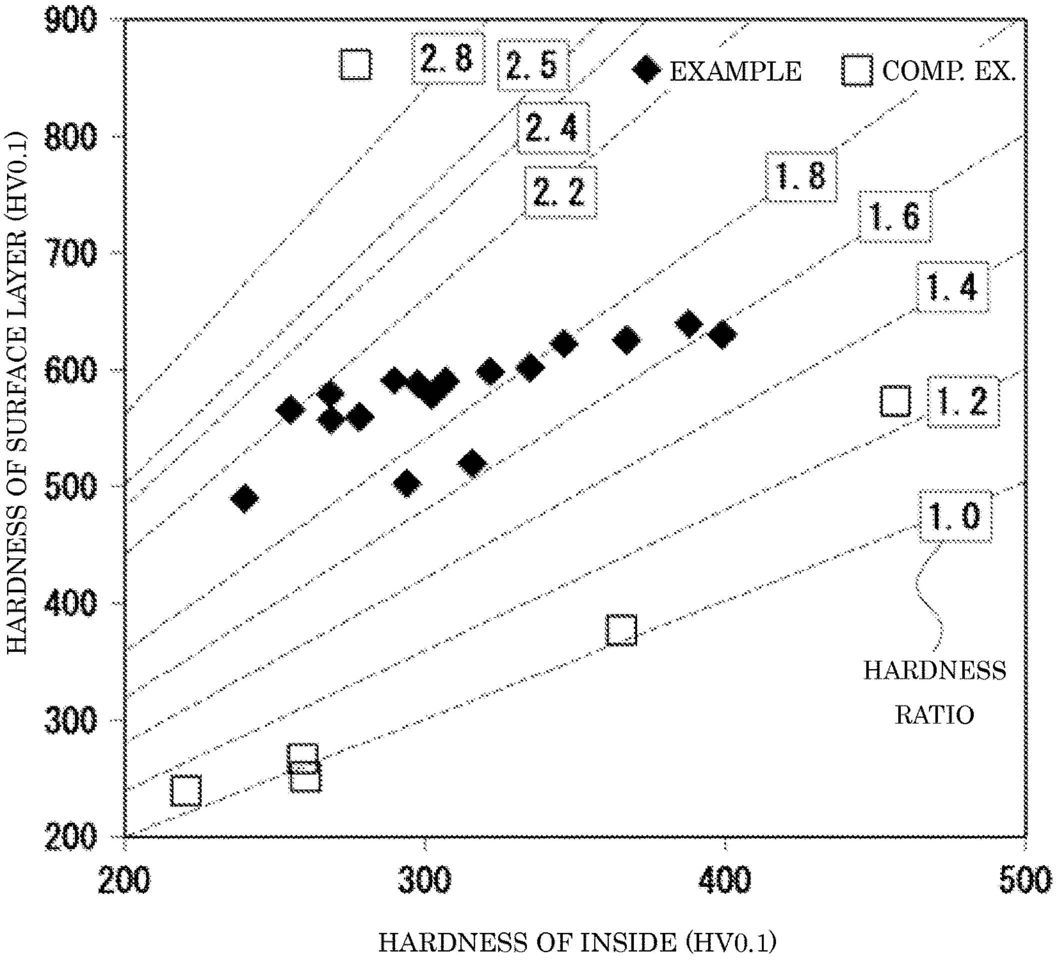
FIG. 8 is a chart which shows a relationship between the hardness of the inside and the hardness of the surface layer.
Figure 9:
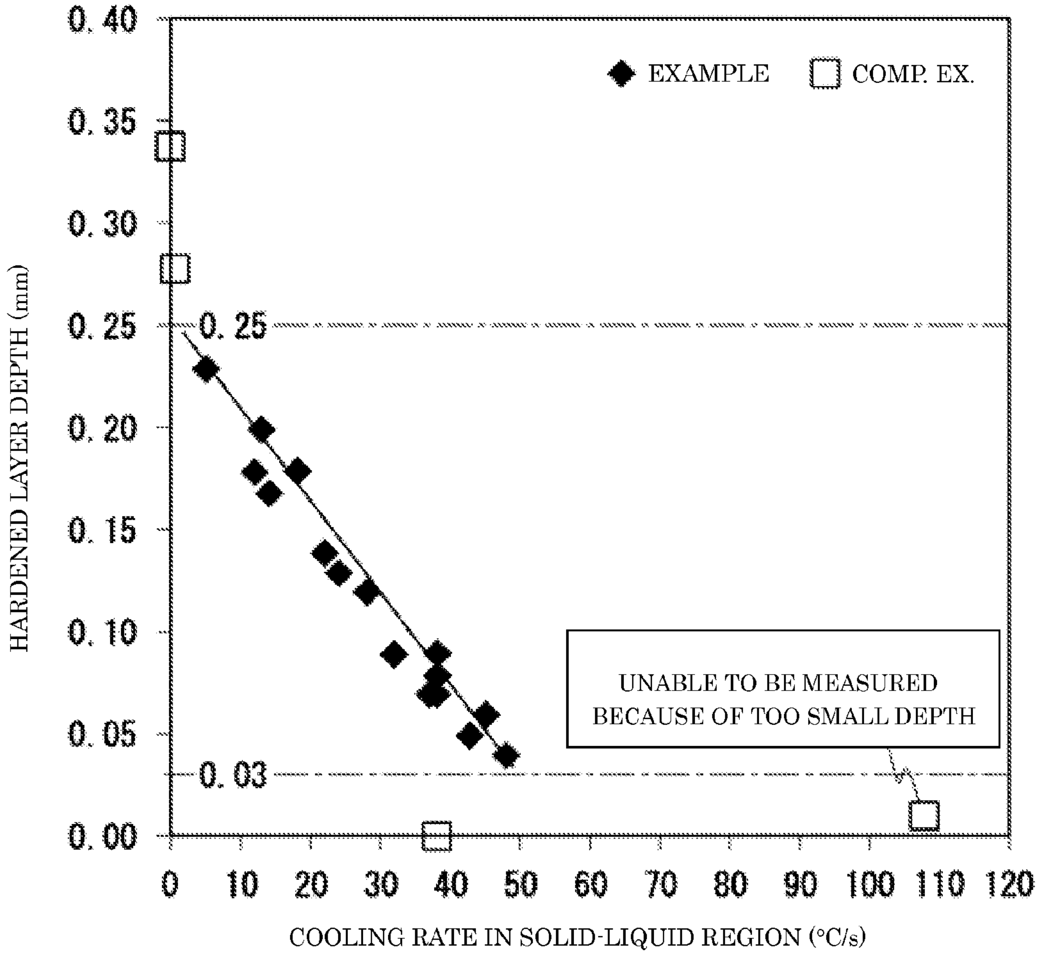
FIG. 9 is a chart which shows a relationship between the cooling rate in a solid-liquid region and the hardened layer depth.
Figure 10:
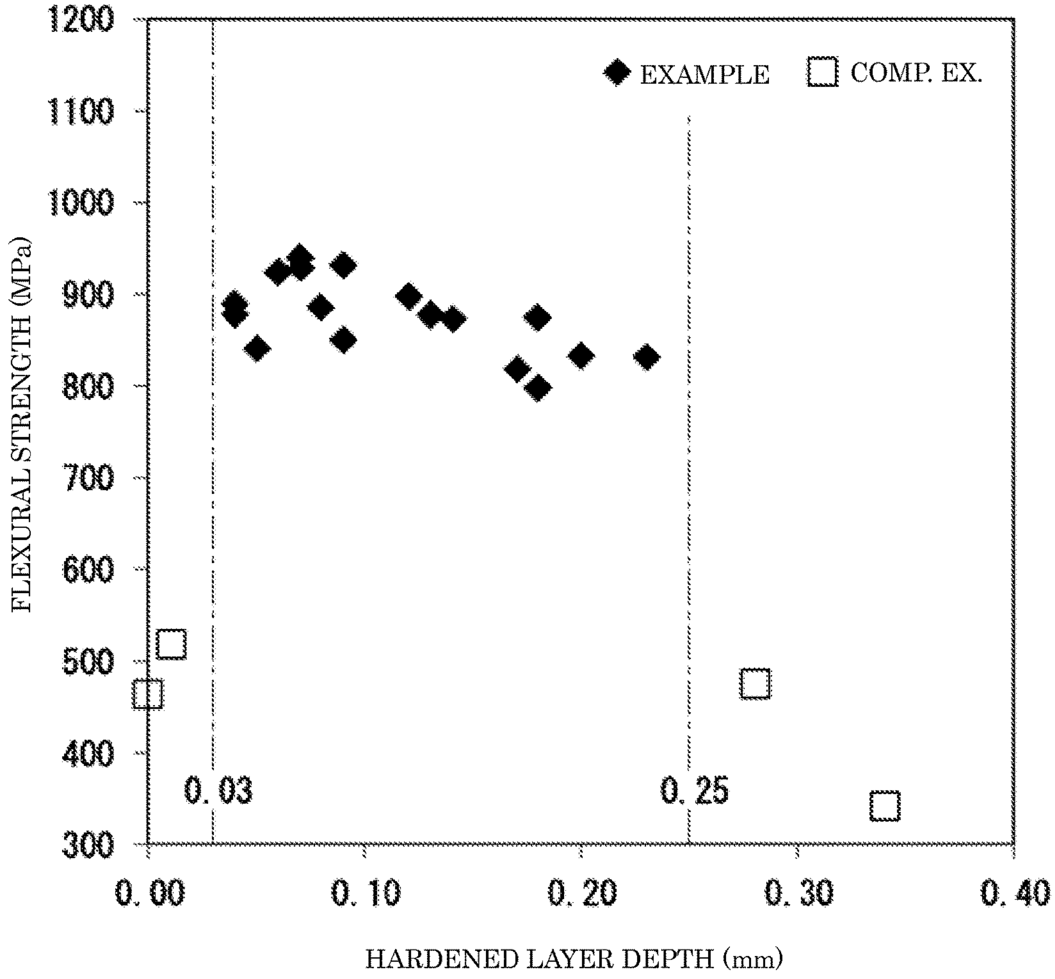
FIG. 10 is a chart which shows a relationship between the hardened layer depth and flexural strength.

FIG. 8 shows a relationship between the hardness of the inside and the hardness of the surface layer. FIG. 9 shows a relationship between the cooling rate in a solid-liquid region and the hardened layer depth. FIG. 10 shows a relationship between the hardened layer depth and flexural strength.

The followings can be seen from Tables 1 and 2 and FIGS. 6 to 10.

TABLE 1

| | Components (mass %) | | | | | | | | | | | | | | Shape of turbine | |
|---|---|---|---|---|---|---|---|---|---|---|---|---|---|---|---|---|
| | Ti | Al | Nb | Ta | W | Mo | Cr | Mn | V | Si | C | B | O | N | wheel | Remarks |
| Example 1 | bal. | 33.5 | 4.79 | — | — | — | 1.02 | — | — | 0.20 | — | — | 0.06 | 0.06 | ϕ50 | as-cast |
| Example 2 | bal. | 33.5 | 4.86 | — | — | — | 1.05 | — | — | 0.20 | — | — | 0.08 | 0.06 | ϕ50 | as-cast |
| Example 3 | bal. | 33.6 | 4.77 | — | — | — | — | 0.80 | — | 0.19 | — | — | 0.09 | 0.03 | ϕ50 | as-cast |
| Example 4 | bal. | 33.4 | 4.83 | — | — | — | 0.91 | — | 0.90 | 0.18 | — | — | 0.08 | 0.07 | ϕ50 | as-cast |
| Example 5 | bal. | 31.8 | 7.40 | — | — | — | 0.89 | — | — | 0.45 | 0.03 | — | 0.07 | 0.06 | ϕ50 | as-cast |
| Example 6 | bal. | 31.7 | 7.64 | — | — | — | 0.89 | — | — | 0.39 | 0.04 | 0.05 | 0.04 | 0.15 | ϕ50 | as-cast |
| Example 7 | bal. | 31.6 | — | 7.40 | — | — | 0.89 | — | — | 0.47 | 0.04 | — | 0.12 | 0.06 | ϕ50 | as-cast |
| Example 8 | bal. | 31.8 | — | — | 6.80 | — | 0.89 | — | — | 0.39 | 0.07 | — | 0.09 | 0.06 | ϕ50 | as-cast |
| Example 9 | bal. | 31.8 | 7.54 | | — | — | 0.89 | — | — | 0.34 | 0.10 | — | 0.06 | 0.08 | ϕ50 | as-cast |
| Example 10 | bal. | 31.9 | 3.80 | 3.60 | — | — | 0.89 | — | — | 0.39 | 0.10 | — | 0.04 | 0.09 | ϕ50 | as-cast |
| Example 11 | bal. | 31.7 | 7.70 | — | — | — | 0.89 | — | — | 0.39 | 0.15 | — | 0.12 | 0.04 | ϕ50 | as-cast |
| Example 12 | bal. | 29.0 | 8.00 | — | — | 1.20 | — | — | — | 0.10 | 0.06 | — | 0.08 | 0.14 | ϕ50 | as-cast |
| Example 13 | bal. | 29.4 | 7.50 | — | — | — | 0.39 | — | — | 0.10 | 0.06 | 0.05 | 0.06 | 0.06 | ϕ50 | as-cast |
| Example 14 | bal. | 30.2 | 12.4 | — | — | — | 0.70 | — | — | 0.15 | 0.07 | — | 0.24 | 0.04 | ϕ50 | HIP |
| Example 15 | bal. | 33.5 | 4.68 | — | — | — | 1.05 | — | — | 0.20 | — | — | 0.05 | 0.06 | ϕ50 | as-cast |
| Example 16 | bal. | 31.8 | 7.44 | — | — | — | 1.02 | — | — | 0.53 | 0.03 | — | 0.06 | 0.08 | ϕ50 | as-cast |
| Example 17 | bal. | 31.9 | 7.46 | — | — | — | 0.99 | — | — | 0.34 | 0.11 | — | 0.08 | 0.08 | ϕ50 | as-cast |
| Comp. Ex. 1 | bal. | 33.4 | 4.81 | — | — | — | 1.01 | — | — | 0.18 | — | — | 0.05 | 0.04 | ϕ50 | as-cast |
| Comp. Ex. 2 | bal. | 33.4 | 4.84 | — | — | — | 1.00 | — | — | 0.21 | — | — | 0.07 | 0.05 | ϕ50 | as-cast |
| Comp. Ex. 3 | bal. | 33.5 | 4.79 | — | — | — | 0.98 | — | — | 0.19 | — | — | 0.05 | 0.03 | ϕ50 | as-cast |
| Comp. Ex. 4 | bal. | 36.0 | 2.00 | — | — | — | 0.20 | — | — | — | — | — | 0.09 | 0.04 | ϕ50 | as-cast |
| Comp. Ex. 5 | bal. | 26.0 | 14.00 | — | — | — | 0.50 | — | — | 0.10 | 0.03 | — | 0.08 | 0.06 | ϕ50 | as-cast |
| Comp. Ex. 6 | bal. | 33.5 | 4.80 | — | — | — | 1.00 | — | — | 0.20 | — | — | 0.05 | 0.06 | ϕ50 | carbonizing |

TABLE 2

| | Cooling rate of surface layer in solid-liquid region (° C./s) | Surface layer (0.02 mm) 0.1 HV | Surface layer (0.02 mm) $\alpha_2$ volume ratio (%) | Inside (0.5 mm) 0.1 HV | Inside (0.5 mm) $\alpha_2$ volume ratio (%) | Hardness ratio (surface layer/ inside) | Hardened layer depth (mm) | Surface layer of wing part Crystal grain diameter (μm) | Surface layer of wing part Flexural strength (MPa) | Inside of wing part Crystal grain diameter (μm) | Inside of wing part Tensile strength (MPa) | Durability test |
|---|---|---|---|---|---|---|---|---|---|---|---|---|
| Example 1 | 5 | 560 | 48 | 278 | 18 | 2.01 | 0.23 | 47.2 | 834 | 384.5 | 456 | not damaged |
| Example 2 | 43 | 558 | 49 | 268 | 18 | 2.08 | 0.05 | 16.8 | 843 | 168.9 | 565 | not damaged |
| Example 3 | 22 | 578 | 48 | 268 | 19 | 2.16 | 0.14 | 32.5 | 876 | 318.6 | 467 | not damaged |
| Example 4 | 38 | 567 | 50 | 254 | 20 | 2.23 | 0.09 | 17.8 | 853 | 301.2 | 478 | not damaged |
| Example 5 | 38 | 591 | 49 | 289 | 18 | 2.04 | 0.08 | 16.8 | 889 | 298.7 | 467 | not damaged |
| Example 6 | 48 | 587 | 42 | 297 | 19 | 1.98 | 0.04 | 17.1 | 881 | 198.3 | 525 | not damaged |
| Example 7 | 24 | 578 | 49 | 302 | 18 | 1.91 | 0.13 | 35.8 | 880 | 335.6 | 489 | not damaged |
| Example 8 | 18 | 589 | 49 | 306 | 19 | 1.92 | 0.18 | 42.0 | 878 | 328.8 | 489 | not damaged |
| Example 9 | 48 | 598 | 51 | 321 | 17 | 1.86 | 0.04 | 16.8 | 891 | 167.8 | 535 | not damaged |
| Example 10 | 28 | 602 | 50 | 335 | 18 | 1.80 | 0.12 | 28.8 | 901 | 304.6 | 471 | not damaged |
| Example 11 | 32 | 625 | 51 | 367 | 19 | 1.70 | 0.09 | 30.8 | 934 | 298.5 | 458 | not damaged |
| Example 12 | 38 | 639 | 53 | 387 | 20 | 1.65 | 0.07 | 18.6 | 941 | 290.7 | 481 | not damaged |
| Example 13 | 37 | 629 | 53 | 398 | 19 | 1.58 | 0.07 | 18.3 | 931 | 287.5 | 490 | not damaged |
| Example 14 | 45 | 622 | 58 | 346 | 21 | 1.80 | 0.06 | 16.8 | 927 | 156.4 | 517 | not damaged |
| Example 15 | 12 | 489 | 38 | 239 | 18 | 2.05 | 0.18 | 43.2 | 801 | 378.9 | 457 | not damaged |
| Example 16 | 14 | 502 | 39 | 293 | 17 | 1.71 | 0.17 | 40.4 | 822 | 355.5 | 459 | not damaged |
| Example 17 | 13 | 520 | 38 | 315 | 18 | 1.65 | 0.20 | 38.5 | 835 | 327.5 | 462 | not damaged |
| Comp. Ex. 1 | 108 | 378 | 18 | 365 | 19 | 1.04 | — | 6.7 | 521 | 78.5 | 398 | damaged |
| Comp. Ex. 2 | 0.5 | 267 | 19 | 258 | 20 | 1.03 | 0.28 | 98.5 | 478 | 783.4 | 358 | damaged |
| Comp. Ex. 3 | 0.05 | 236 | 15 | 218 | 18 | 1.09 | 0.34 | 128.9 | 346 | 1089.1 | 344 | damaged |
| Comp. Ex. 4 | 38 | 255 | 15 | 259 | 16 | 0.98 | 0.00 | 19.2 | 467 | 299.7 | 322 | damaged |
| Comp. Ex. 5 | 47 | 573 | 57 | 456 | 38 | 1.26 | — | 18.8 | broken early | 176.5 | broken early | damaged |
| Comp. Ex. 6 | 48 | 860 | — | 276 | 18 | 3.12 | — | 18.8 | broken early | 187.9 | broken early | damaged |

(1) With respect to each sample in which a hardened layer had been observed, an inter-wing portion thereof was analyzed for Al content by EPMA. As a result, it was found that the Al content of the surface layer part was lower than that of the inside (FIG. 6). The Al content of the inter-wing portion increased toward the inside, and the Vickers hardness thereof decreased toward the inside (FIG. 7).

The Vickers hardness HV correlates with the $\alpha_2$ volume ratio. Meanwhile, the $\alpha_2$ volume ratio of the inter-wing portion increases toward the inside. The reason why the Vickers hardness HV of the surface layer part is higher than that of the inside is thought to be that the $\alpha_2$ volume ratio of the surface layer part has increased due to the reduced Al content of the surface layer part.

(2) In each of Examples 1 to 17, the hardness of the surface layer of the inter-wing portion was HV 450 or higher and the hardness of the inside thereof was HV 400 or less. The hardness ratio thereof was 1.4 to 2.5, showing that the surface layer had been sufficiently hardened as compared with the inside (FIG. 8). Furthermore, in each of Examples 1 to 17, a sufficient hardened layer depth was obtained (FIG. 9).

(3) In Comparative Example 1, a sufficient hardened layer depth was not observed (FIG. 9). This is because the cooling rate in the solid-liquid region had been too high and, hence, a primary-crystal β phase had not grown sufficiently.

In Comparative Examples 2 and 3 also, a sufficient hardened layer depth was not observed. This is because the cooling rate in the solid-liquid region had been too low and, hence, the homogenization of components had proceeded.

(4) Examples 1 to 17 each attained a flexural strength of 800 MPa or higher since the sample had a hardened surface layer and the crystal grain diameter of the surface layer of the wing part had been suitably regulated; these flexural strengths were higher than those of Comparative Examples 1 to 7, which had no hardened surface layer or had an excessively thick hardened surface layer (FIG. 10). Even the HIP material (Example 14) and the large products (Examples 15 to 17) each showed a high flexural strength. In addition, since the inside of the wing part had a suitable structure, each Example further showed a higher value of tensile strength as compared with the Comparative Examples. In the turbine wheel durability test, all the turbine wheels of the Examples remained undamaged.

(5) In Comparative Example 4, hardening of the surface layer was not observed. This is because the content of Al had been excessively high and, hence, an α phase had been formed as primary crystals.

In Comparative Example 5, the surface layer had a high hardness but the inside had nearly the same hardness. This Comparative Example failed to harden the surface layer only. This is because the content of Al had been too low.

(6) In Comparative Example 6, the surface layer had been highly hardened due to the carbonizing, but the inside had remained unhardened. In addition, the necessity of carbonizing leads to a high cost.

While embodiments of the present invention have been described in detail, the invention should not be construed as being limited to the embodiments in any way and various changes and modifications can be made therein without departing from the gist of the invention.

The present application is based on Japanese Patent Applications No. 2014-065673 filed on Mar. 27, 2014 and No. 2015-028942 filed on Feb. 17, 2015, and the contents are incorporated herein by reference.

The Ti—Al-based heat-resistant member according to the present invention can be used as the turbine wheel of an automotive turbocharger, etc.

What is claimed is:

1. A Ti—Al-based heat-resistant member comprising a Ti—Al-based alloy which comprises:

28.0 mass % to 35.0 mass % of Al;

1.0 mass % to 15.0 mass % of at least one selected from the group consisting of Nb, Mo, W and Ta;

0.1 mass % to 5.0 mass % of at least one selected from the group consisting of Cr, Mn and V; and 0.1 mass % to 1.0 mass % of Si, with the balance being Ti and unavoidable impurities, wherein a whole or a part of a surface of the Ti—Al-based heat-resistant member includes a hardened layer as a surface layer, said hardened layer having a higher hardness than an inside of the Ti—Al-based heat-resistant member, and the Ti—Al-based heat-resistant member has a hardness ratio represented by the following expression (a) of 1.4 to 2.5:

$$\text{Hardness ratio} = HV_S/HV_I \quad (a)$$

in which $HV_S$ is a hardness of the surface layer and is a Vickers hardness measured at a site located at a distance of 0.02 mm±0.005 mm from the surface of the Ti—Al-based heat-resistant member (load: 0.98 N), and $HV_I$ is a hardness of the inside of the Ti—Al-based heat-resistant member and is a Vickers hardness measured at a site located at a distance of 0.50 mm±0.10 mm from the surface of the Ti—Al-based heat-resistant member (load: 0.98 N).

2. The Ti—Al-based heat-resistant member according to claim 1, wherein the Ti—Al-based alloy further comprises from 0.01 mass % to 0.2 mass % of C.

3. The Ti—Al-based heat-resistant member according to claim 1, wherein the Ti—Al-based alloy further comprises from 0.005 mass % to 0.200 mass % of B.

4. The Ti—Al-based heat-resistant member according to claim 2, wherein the Ti—Al-based alloy further comprises from 0.005 mass % to 0.200 mass % of B.

5. The Ti—Al-based heat-resistant member according to claim 1, wherein the hardened layer has a hardened layer depth, which is a distance from the surface of the Ti—Al-based heat-resistant member to a site where the hardness is $(HV_S+HV_I)/2$, of 0.03 to 0.25 mm.

6. The Ti—Al-based heat-resistant member according to claim 2, wherein the hardened layer has a hardened layer depth, which is a distance from the surface of the Ti—Al-based heat-resistant member to a site where the hardness is $(HV_S+HV_I)/2$, of 0.03 to 0.25 mm.

7. The Ti—Al-based heat-resistant member according to claim 3, wherein the hardened layer has a hardened layer depth, which is a distance from the surface of the Ti—Al-based heat-resistant member to a site where the hardness is $(HV_S+HV_I)/2$, of 0.03 to 0.25 mm.

8. The Ti—Al-based heat-resistant member according to claim 4, wherein the hardened layer has a hardened layer depth, which is a distance from the surface of the Ti—Al-based heat-resistant member to a site where the hardness is $(HV_S+HV_I)/2$, of 0.03 to 0.25 mm.

9. The Ti—Al-based heat-resistant member according to claim 1, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

10. The Ti—Al-based heat-resistant member according to claim 2, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

11. The Ti—Al-based heat-resistant member according to claim 3, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

12. The Ti—Al-based heat-resistant member according to claim 4, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

13. The Ti—Al-based heat-resistant member according to claim 5, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

14. The Ti—Al-based heat-resistant member according to claim 6, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

15. The Ti—Al-based heat-resistant member according to claim 7, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

16. The Ti—Al-based heat-resistant member according to claim 8, wherein the hardened layer has an $\alpha_2$ volume ratio, which is a volume ratio of an $\alpha_2$ phase measured at a site located at a distance of 0.02 mm±0.005 mm from the surface of the Ti—Al-based heat-resistant member, of 30 to 60% by volume.

17. The Ti—Al-based heat-resistant member according to claim 1, which is a turbine wheel.

18. The Ti—Al-based heat-resistant member according to claim 2, which is a turbine wheel.

19. The Ti—Al-based heat-resistant member according to claim 17, wherein a surface layer of a wing part of the turbine wheel has an average crystal grain diameter of 10 to 50 μm and has an equi-axed grain structure having random crystal orientation.

20. The Ti—Al-based heat-resistant member according to claim 18, wherein a surface layer of a wing part of the turbine wheel has an average crystal grain diameter of 10 to 50 μm and has an equi-axed grain structure having random crystal orientation.

21. The Ti—Al-based heat-resistant member according to claim 19, wherein an inside of the wing part of the turbine wheel has an average crystal grain diameter of 100 to 500 μm and has an equi-axed grain structure having random crystal orientation.

22. The Ti—Al-based heat-resistant member according to claim 20, wherein an inside of the wing part of the turbine wheel has an average crystal grain diameter of 100 to 500 μm and has an equi-axed grain structure having random crystal orientation.

* * * * *